(12) United States Patent
Bayerle et al.

(10) Patent No.: US 7,380,983 B2
(45) Date of Patent: Jun. 3, 2008

(54) METHOD AND DEVICE FOR CHECKING TEMPERATURE VALUES OF A TEMPERATURE SENSOR OF AN INTERNAL COMBUSTION ENGINE

(75) Inventors: Klaus Bayerle, Obertraubling (DE); Wolfgang Moser, Regensburg (DE); Oliver Prinz, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 11/294,800

(22) Filed: Dec. 6, 2005

(65) Prior Publication Data

US 2006/0120430 A1   Jun. 8, 2006

(30) Foreign Application Priority Data

Dec. 6, 2004   (DE) ...................... 10 2004 058 714

(51) Int. Cl.
*G01K 13/00*   (2006.01)
*G01K 3/04*   (2006.01)
*G01K 17/06*   (2006.01)

(52) U.S. Cl. .......................................... 374/144; 374/1

(58) Field of Classification Search ................ 374/144, 374/141, 170; 73/23.32, 23.2; 123/697, 123/679, 676, 41.05, 41.12, 339.22, 339.24, 123/406.55, 678, 686, 688, 568.22, 578, 123/588, 179.13, 179.15, 488, 693–695, 123/698; 60/672, 274, 276, 277, 284, 285, 60/286, 295, 297
See application file for complete search history.

(56) References Cited

U.S. PATENT DOCUMENTS

| | | | | |
|---|---|---|---|---|
| 4,655,182 A | * | 4/1987 | Nakano et al. ........... 123/179.1 |
| 4,891,970 A | * | 1/1990 | Remboski, Jr. ................ 73/116 |
| 5,675,967 A | * | 10/1997 | Ries-Mueller ................ 60/274 |
| 5,765,368 A | * | 6/1998 | Matsumoto et al. .......... 60/274 |
| 5,845,487 A | * | 12/1998 | Fraenkle et al. ............... 60/274 |
| 5,877,413 A | * | 3/1999 | Hamburg et al. .......... 73/118.1 |
| 5,920,617 A | * | 7/1999 | Berger et al. ................ 165/202 |
| 5,937,940 A | * | 8/1999 | Davis et al. ................. 165/202 |
| 6,026,679 A | * | 2/2000 | Holmes et al. ............. 73/117.3 |
| 6,202,406 B1 | * | 3/2001 | Griffin et al. .................. 60/274 |
| 6,295,808 B1 | * | 10/2001 | Griffin et al. .................. 60/776 |
| 6,324,893 B1 | * | 12/2001 | Watanabe et al. .......... 73/23.32 |
| 6,926,074 B2 | * | 8/2005 | Worner ....................... 165/159 |
| 7,010,967 B2 | * | 3/2006 | Wakahara et al. .......... 73/118.1 |
| 7,104,044 B2 | * | 9/2006 | Moore et al. .................. 60/284 |
| 7,150,145 B2 | * | 12/2006 | Patchett et al. ................ 60/286 |
| 2001/0027785 A1 | * | 10/2001 | Almkvist ..................... 123/675 |
| 2002/0056272 A1 | * | 5/2002 | Isobe et al. .................... 60/285 |
| 2002/0083702 A1 | * | 7/2002 | Iihoshi et al. ................. 60/285 |

(Continued)

FOREIGN PATENT DOCUMENTS

DE   198 55 971 A1   6/2000

(Continued)

*Primary Examiner*—Gail Verbitsky

(57) ABSTRACT

In a method for checking temperature values of a temperature sensor of an internal combustion engine, a first temperature value is recorded during a first predefined time period close in time to an operating state of the starting of the internal combustion engine. With the method a check is made to determine whether a cold start of the internal combustion engine is present. An error in the first temperature value is detected if the cold start is detected and the first temperature value is greater than a temperature threshold value.

8 Claims, 3 Drawing Sheets

U.S. PATENT DOCUMENTS

| | | | |
|---|---|---|---|
| 2004/0088969 A1* | 5/2004 | Lewis et al. | 60/284 |
| 2004/0129065 A1* | 7/2004 | Plote et al. | 73/117.3 |
| 2004/0182072 A1* | 9/2004 | Majima et al. | 60/285 |
| 2004/0187478 A1* | 9/2004 | Tamura et al. | 60/284 |
| 2004/0211169 A1* | 10/2004 | Koyama et al. | 60/277 |
| 2006/0016175 A1* | 1/2006 | Pott et al. | 60/285 |
| 2006/0120430 A1* | 6/2006 | Bayerle et al. | 374/1 |
| 2006/0207557 A1* | 9/2006 | Ito et al. | 123/431 |
| 2006/0278202 A1* | 12/2006 | Sieber et al. | 123/520 |
| 2007/0144145 A1* | 6/2007 | Takasuto et al. | 60/277 |

FOREIGN PATENT DOCUMENTS

| | | |
|---|---|---|
| DE | 103 06 698 A1 | 9/2004 |
| DE | 103 16 606 A1 | 11/2004 |
| EP | 1 273 781 A2 | 1/2003 |
| JP | 2000282930 A | 10/2000 |
| WO | WO 2004/089667 A1 | 10/2004 |

\* cited by examiner

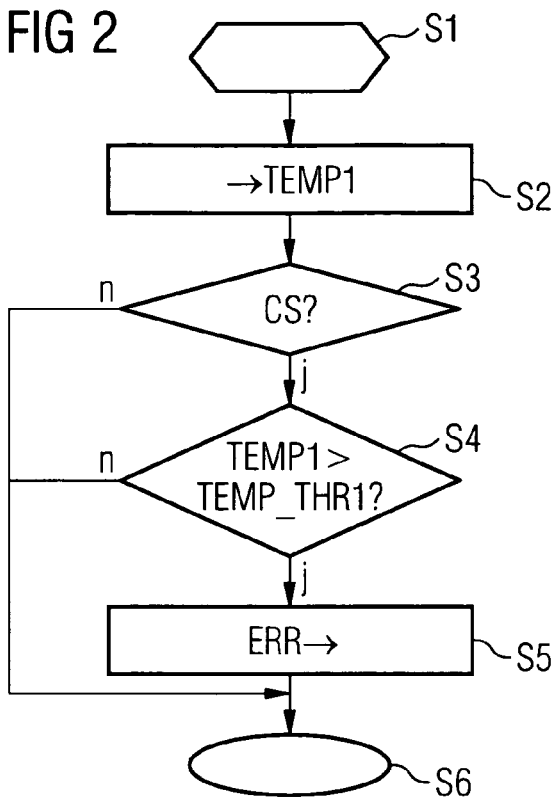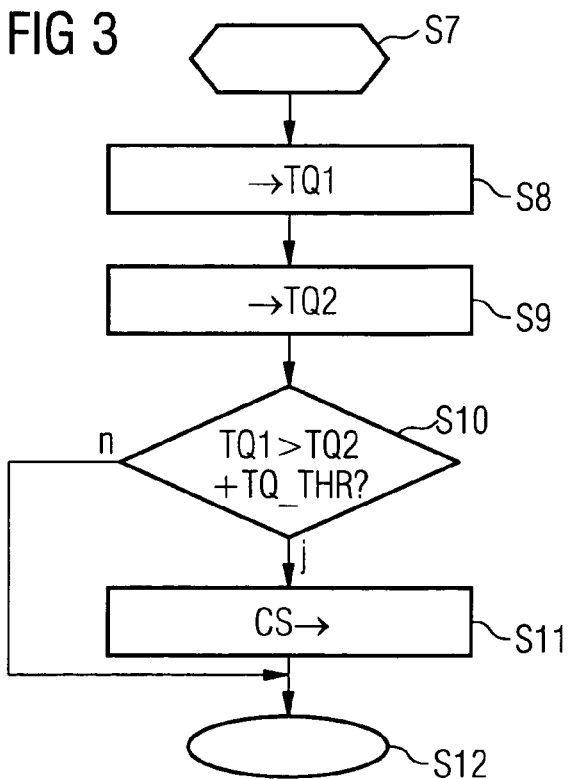

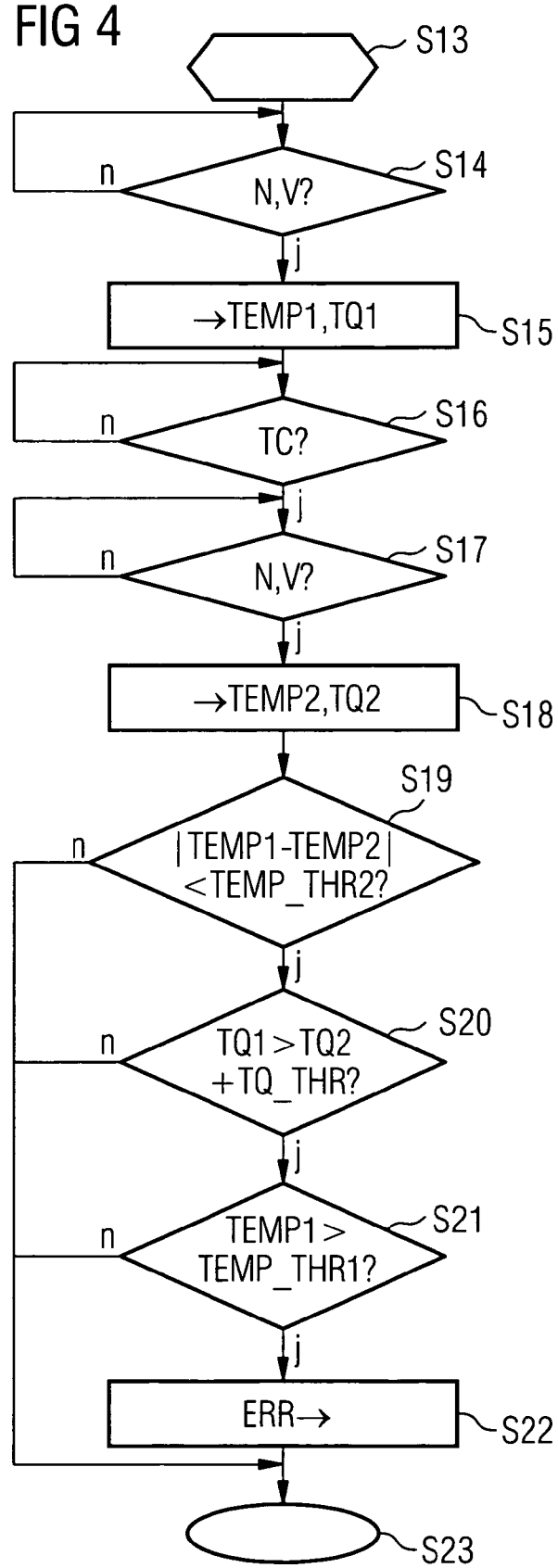

METHOD AND DEVICE FOR CHECKING TEMPERATURE VALUES OF A TEMPERATURE SENSOR OF AN INTERNAL COMBUSTION ENGINE

CROSS REFERENCE TO RELATED APPLICATION

This application claims priority of the German application No. 10 2004 058 714.0 DE filed Dec. 06, 2004, which is incorporated by reference herein in its entirety.

FIELD OF THE INVENTION

The invention relates to a method and a corresponding device for checking temperature values of a temperature sensor of an internal combustion engine.

BACKGROUND OF THE INVENTION

The demands imposed on internal combustion engines, in particular in motor vehicles, are increasing as a result of statutory provisions governing exhaust emissions and on account of customer requirements relating to reliability, efficient use of resources, in particular fuel, and low maintenance costs. These requirements can only be met if malfunctions of vehicle components are reliably and accurately detected and logged so that malfunctions can be neutralized or a repair of the faulty vehicle components can be initiated. Toward that end, vehicle components, in particular all vehicle components relevant to exhaust gases, such as, for example, a catalytic converter system, a lambda probe, a fuel system and a cooling system, are monitored. For motor vehicles starting with the 2006 model year for the US American market, the regulations stipulate in particular that temperature values of a coolant temperature sensor should be monitored to check that they remain within a predefined temperature range, since raw emissions of the internal combustion engine, that is to say emissions that have not undergone an exhaust gas after treatment, may be increased due to incorrect temperature values of the coolant temperature sensor. The monitoring measures are intended to ensure low-emission operation and maintain driving safety. Also part of these measures is that when faults occur an emergency running of the internal combustion engine is ensured and consequential damage can be avoided. If necessary the driver of the motor vehicle is alerted to the malfunction so that he/she can initiate an inspection and/or repair in a workshop. A control device of the internal combustion engine stores information about the faults that have occurred, such as, for example, a fault type, a fault location and where applicable the operating conditions under which the malfunction occurred. This information can be evaluated in a workshop and so assist the repair work.

SUMMARY OF THE INVENTION

The object of the invention is to create a method and a corresponding device by means of which the temperature values of a temperature sensor can be checked.

The object is achieved by the features of the independent claims. Advantageous developments of the invention are characterized in the dependent claims.

The invention is characterized by a method and a corresponding device for checking temperature values of a temperature sensor of an internal combustion engine wherein a first temperature value is recorded during a first predefined time period close in time to an operating state of the starting of the internal combustion engine. With the method a check is made to determine whether a cold start of the internal combustion engine is present. An error in the first temperature value is detected if the cold start is detected and the first temperature value is greater than a temperature threshold value.

The advantage is that the first temperature value is easy to check because the internal combustion engine warms up during operation and at a cold start a temperature of the internal combustion engine is less than in the case of an internal combustion engine at its normal operating temperature. Thus, if the temperature threshold value is exceeded, an error in the first temperature value can be concluded.

The first predefined time period preferably comprises a time period during which the temperature of the internal combustion engine has not yet warmed up or has warmed up only slightly due to the operation of the internal combustion engine. The first temperature value is preferably recorded immediately subsequent to the starting operating state, but can also be recorded prior to the starting operating state.

In an advantageous embodiment of the invention a first torque value of the internal combustion engine is determined during the first predefined time period. A second torque value of the internal combustion engine is determined during at least a second predefined time period which lies subsequently in time with respect to the first predefined time period. The cold start of the internal combustion engine is detected if the first torque value is greater by a predefined amount or a predefined factor than the second torque value. The advantage is that the cold start can be easily and reliably determined because the cold internal combustion engine requires a higher torque than the warm internal combustion engine due to increased friction under an otherwise equal load. Furthermore the cold start can also be reliably detected if a period of time during which the internal combustion engine is switched off, that is to say a period between an instant in time when operation is terminated and an instant in time when operation is next started, is not known in order to permit a conclusion to be reached about a cold start or a warm start.

The first torque value is preferably determined after the internal combustion engine has been started and the torque is stabilized, with the result that the fluctuation range of the torque is small, such as, for example, during an idling operating state. The at least one second predefined time period preferably comprises a time period during which the internal combustion engine has warmed up as a result of its operation. The cold start can be detected particularly reliably if the second torque value is determined when the internal combustion engine is at its normal operating temperature. The first and second torque values are preferably determined under equal load and/or during a stationary operating state, such as, for example, the idling operating state.

In this connection it is advantageous if the second predefined time period lies close in time to the termination of operation of the internal combustion engine. This has the advantage that the probability that the internal combustion engine has already reached its operating temperature is particularly great. The second temperature value can be recorded before or after the termination of operation; the second torque value is determined before the termination of operation.

In a further advantageous embodiment of the invention the first torque value is averaged over a third predefined time period which lies temporally within the first predefined time period, and/or the second torque value is averaged over a fourth predefined time period which lies temporally within the second predefined time period. The advantage is that the cold start can also be reliably determined during fluctuations in the torque which are unavoidable even during stationary operating states.

In a further advantageous embodiment of the invention a second temperature value is recorded during the second predefined time period. The cold start is only detected if the second temperature value is greater or less than the first temperature value by not more than a predefined amount or a predefined factor. This has the advantage that the first torque value and the second torque value can be very easily compared with each other and the cold start can be detected particularly reliably.

In a further advantageous embodiment of the invention the first predefined time period and/or the at least one second predefined time period each lie/lies temporally within an idling operating state. This has the advantage that the idling operating state can be assumed particularly reliably and reproducibly. If the first and the second torque value and where applicable the first and the second temperature value are determined or, as the case may be, recorded during the idling operating state, then the first and the second torque value and/or the first and the second temperature value can easily be compared with each other and in this way the error in the first temperature value can be detected particularly reliably.

BRIEF DESCRIPTION OF THE DRAWINGS

Exemplary embodiments of the invention are explained below with reference to the schematic drawings, in which:

FIG. 2 shows a first flowchart,
FIG. 3 shows a second flowchart,
FIG. 4 shows a third flowchart.

DETAILED DESCRIPTION OF THE INVENTION

Figure 1:
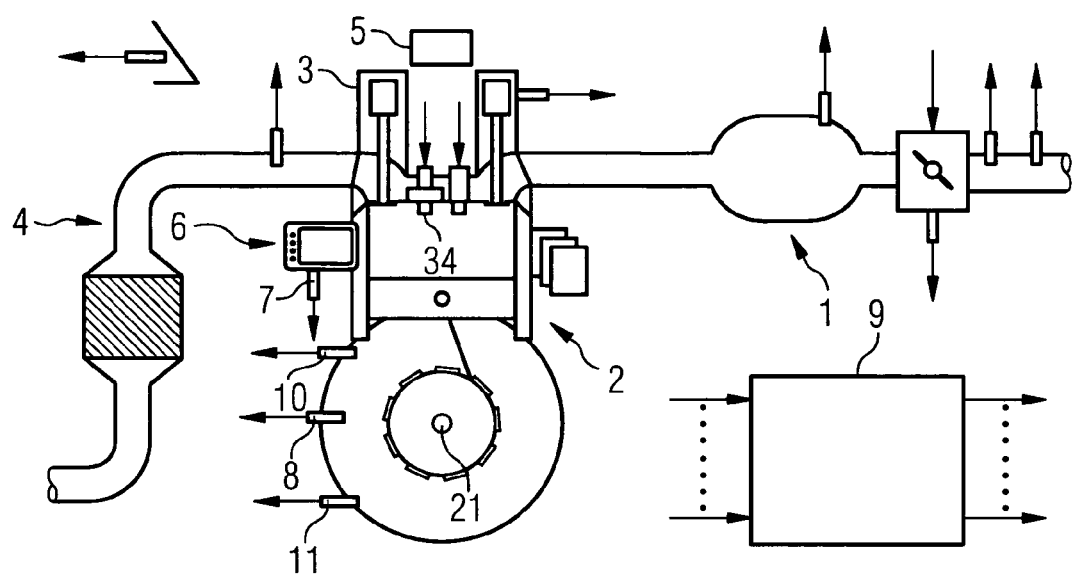
FIG. 1 shows an internal combustion engine with a control unit.

Elements of identical construction or function are provided with the same reference symbols in all the figures.

An internal combustion engine (FIG. 1) comprises an intake duct 1, an engine block 2, a cylinder head 3 and an exhaust gas duct 4. The engine block 2 comprises several cylinders which have pistons and connecting rods via which they are coupled to a crankshaft 21. Also provided is a supply device 5 for fuel.

The cylinder head 3 comprises a valve actuating mechanism with a gas inlet valve, a gas outlet valve and valve gears. The cylinder head 3 further comprises an injection valve 34 and a sparkplug.

The engine block 2 is embodied such that coolant, for example water containing additives, flows through areas thereof in a cooling circuit 6. The heat generated in the engine block 2 during operation is dissipated to a cooler which is arranged in the cooling circuit outside the engine block 2 and preferably has air flowing around it. The heat dissipated from the internal combustion engine by means of the flowing coolant is discharged into the air. A coolant temperature sensor 7 is preferably provided which records a coolant temperature value. The coolant temperature value is dependent on a temperature of the engine block 2.

Also associated with the internal combustion engine is a control device 9, which can also be described as an apparatus for checking temperature values of a temperature sensor of the internal combustion engine. The control device 9 is embodied to execute programs that are stored in the control device 9 or in a memory that is linked thereto. The control device 9 is assigned sensors which register different measurable variables and in each case determine the measured value of the measurable variable. Depending on at least one of the measurable variables, the control device 9 determines actuating variables which are then converted into corresponding actuating signals for controlling actuating elements by means of corresponding servo motor drives.

The sensors include, for example, a pedal position transducer which registers the position of a driving pedal, a crankshaft angle sensor 10 which registers a crankshaft angle and to which a speed N is then assigned, an air mass meter, the coolant temperature sensor 7 which records the coolant temperature value, an oil temperature sensor 8 which records an oil temperature value, or a torque sensor 11. According to the embodiment of the invention an arbitrary subset of the sensors or also additional sensors may be present.

The actuating elements are embodied for example as gas inlet or gas outlet valves, injection valves 34, sparkplug or throttle valve.

The internal combustion engine preferably also has further cylinders to which corresponding actuating elements are then assigned.

A program for checking temperature values, the flowchart of which is shown in FIG. 2, is started in a step S1. Step S1 is preferably performed at a start of the internal combustion engine. In a step S2 a first temperature value TEMP1 of the internal combustion engine is recorded by means of a temperature sensor. Said temperature sensor is, for example, the coolant temperature sensor 7 or the oil temperature sensor 8, but may also be some other temperature sensor which registers a temperature value of the internal combustion engine. The first temperature value TEMP1 is then the associated measured value of the respective temperature sensor.

The first temperature value TEMP1 is recorded during a first predefined time period close in time to the operating state of the starting of the internal combustion engine. During the first predefined time period a temperature of the internal combustion engine is preferably essentially constant. In particular the first predefined time period is specified such that following a cold start CS the internal combustion engine has not yet warmed up during its operation or the internal combustion engine has warmed up only slightly, e.g. only by a few degrees. The first predefined time period can be dependent, for example, on the type or size of the internal combustion engine and on the operating state in which the internal combustion engine is operated following the starting operating state. Thus, for example, the internal combustion engine warms up faster when it is operated in an operating state under heavy load or at a high speed N than in an idling operating state. The first predefined time period amounts, for example, to a few seconds or a few minutes, but may also be shorter or longer.

The first temperature value TEMP1 is preferably recorded immediately after the starting operating state. The first temperature value TEMP1 can, however, equally well be recorded prior to the starting of the internal combustion engine and stored. In step S2, in this case, the stored first temperature value TEMP1 can also be read out.

In a step S3 a check is made to determine whether the cold start CS of the internal combustion engine is present. If this is the case, then in a step S4 the first temperature value TEMP1 is compared with a first predefined temperature threshold value TEMP_THR1 and a check is made to determine whether the first temperature value TEMP1 is greater than the first predefined temperature threshold value TEMP_THR1. If this condition is met, then an error ERR in the first temperature value TEMP1 is detected.

With the cold start CS it is expected that the first temperature value TEMP1 is less than in the case of a warm start. If the first predefined temperature threshold value TEMP_THR1 is specified such that the first temperature value TEMP1 at the time of the cold start CS is greater than the first predefined temperature threshold value TEMP_THR1 only if the first temperature value TEMP1 is incorrect, then the error ERR in the first temperature value TEMP1 can be reliably detected. If a temperature of the internal combustion engine is, for example, approximately 95° C. in a warm operating state, then there is a high probability that the first temperature value TEMP1 is incorrect if the latter corresponds at the time of the cold start CS to a temperature of the internal combustion engine of, for example, more than 80° C. Thus, it can easily be detected if the first temperature value TEMP1 at the time of the cold start CS corresponds to a temperature of the internal combustion engine which is associated with the warm internal combustion engine at normal operating temperature. The first predefined temperature threshold value TEMP_THR1 can also be specified as a function of a further temperature value, e.g. an ambient temperature value, which is recorded for example by means of a further temperature sensor.

If the cold start CS is not detected in step S3 or if, in step S4, the first temperature value TEMP1 is less than or equal to the first predefined temperature threshold value TEMP_THR1, then the program run is terminated in a step S6. The program run is also terminated in step S6 if the error ERR was detected in step S5.

FIG. 3 shows a flowchart of a program for detecting the cold start CS which is started in a step S7. Step S7 is preferably performed at the starting of the internal combustion engine.

A first torque value TQ1 of the internal combustion engine is determined in a step S8. The first torque value TQ1 is determined during the first predefined time period after the operating state of the starting of the internal combustion engine. The first torque value TQ1 is preferably determined after the torque of the internal combustion engine has stabilized and is essentially stationary, i.e. the fluctuation range of the torque is small. This can be achieved, for example, if a speed N and a load that is present at the internal combustion engine are essentially constant.

A second torque value TQ2 of the internal combustion engine is determined in a step S9. The second torque value TQ2 is determined during a second predefined time period which lies after the first predefined time period in time. The second predefined time period is specified such that the internal combustion engine has already warmed up as a result of its operation, preferably to its normal operating temperature. The second torque value TQ2 is determined before the termination of operation of the internal combustion engine, preferably in an operating state in which the torque of the internal combustion engine is stationary, which is to say, for example, at an essentially constant speed N and load. The second torque value TQ2 is preferably determined in an operating state which is comparable with that operating state, in particular with regard to the load and the speed N, in which the first torque value TQ1 was determined. It is particularly advantageous if the second predefined torque value TQ2 is recorded close in time to the termination of the operation of the internal combustion engine, for example during the last idling operating state before the termination of the operation of the internal combustion engine, since then the probability that the internal combustion engine has reached its operating temperature is at its greatest.

In a step S10 a check is made to determine whether the first torque value TQ1 is greater than a sum formed from the second torque value TQ2 and a predefined torque threshold value TQ_THR. If this is the case, then the cold start CS is detected in a step S11 and the program run is terminated in a step S12. If the condition in step S10 is not met, then the program is likewise terminated in step S12. In this case a warm start is present.

At the cold start CS, under conditions of essentially equal load and speed N, the first torque value TQ1 is greater, due to increased friction in the cold internal combustion engine, than the second torque value TQ2, which is recorded when the internal combustion engine is at its normal operating temperature. The predefined torque threshold value TQ_THR is dependent on the type, the size or the performance of the internal combustion engine and is specified such that the cold start CS can be reliably detected.

The first torque value TQ1 and the second torque value TQ2 are preferably determined under conditions of essentially constant and stationary load and essentially constant and stationary speed N which is essentially equal to a reference value of the speed N. The first torque value TQ1 and the second torque value TQ2 are particularly advantageously determined during the idling operating state, since the latter operating state can be assumed reliably and reproducibly. However, it is not always possible to determine the first torque value TQ1 and the second torque value TQ2 under said conditions. For example, the load may be increased due to one or more additionally connected auxiliary units, such as an air conditioning system for example. Additionally connected auxiliary units increase the torque necessary to enable the speed N to be maintained. To enable the first torque value TQ1 and the second torque value TQ2 to be compared with each other for the purpose of detecting the cold start CS, said values are preferably transformed computationally so that differences in the respective operating state, the speed N or the load are canceled out. For this purpose, for example, those torque components that are caused by the possibly additionally connected auxiliary units are subtracted from the first torque value TQ1 and/or the second torque value TQ2.

The first torque value TQ1 and the second torque value TQ2 are preferably determined in each case as an average of individual torque values. The individual torque values of the internal combustion engine are preferably determined during a third and a fourth predefined time period. The third predefined time period lies temporally within the first predefined time period and the fourth predefined time period lies temporally within the second predefined time period. The average is preferably taken in each case over a predefined number of individual torque values, for example over five individual torque values, each of which is determined in the third or, as the case may be, fourth predefined time period. The first torque value TQ1 is determined from the individual torques determined during the third predefined time period, and the second torque value TQ2 is determined correspondingly from the individual torques determined during the fourth predefined time period. The determining of the first torque value TQ1 in step S8 and the determining of the second torque value TQ2 in step S9 can be made more precise by determining the individual torques on which the first torque value TQ1 or, as the case may be, the second torque value TQ2 is based during the first predefined time period or, as the case may be, the second predefined time period. The first torque value TQ1 or the second torque value TQ2 can also be determined from the individual torques after the first predefined time period or, as the case may be, the second predefined time period has elapsed.

The first torque value TQ1 and the second torque value TQ2 are recorded, for example, by means of the torque sensor 11. The first torque value TQ1 and the second torque value TQ2 can, however, also be determined as an operand dependent on measurable variables in the control device 9, based, for example, on a physical model, or by means of an engine characteristics map that was determined for example in advance by tests conducted on an engine test bench, by simulations or by test drives.

FIG. 4 shows a flowchart of a further program for monitoring temperature values which is started in a step S13. Step S13 is preferably performed at the starting of the internal combustion engine.

In a step S14 a check is made to determine whether a suitable operating state is present in which the speed N is preferably stationary and a velocity V, for example of a motor vehicle in which the internal combustion engine is disposed, is stationary or equal to zero, e.g. during the idling operating state. If the condition is not met, then step S14 is repeated, where appropriate after a waiting period. If the condition is met, however, then the first temperature value TEMP1 and the first torque value TQ1 are recorded or, as the case may be, determined in a step S15. Step S15 is performed during the first predefined time period.

In a step S16 a check is made to determine whether a predefined operating period TC following the start of the internal combustion engine has elapsed. If this is not the case, then step S16 is repeated, where appropriate after a waiting period has elapsed. The predefined operating period TC is preferably specified such that the internal combustion engine has suitably warmed up during it, preferably to its normal operating temperature. If the predefined operating period TC has elapsed, then a new check is made in a step S17, corresponding to step S14, to determine whether the suitable operating state is present in order, in a step S18, if the condition in step S17 is met, to record or, as the case may be, determine a second temperature value TEMP2 and the second torque value TQ2. Step S17 is performed during the second predefined time period.

In a step S19 a check is made to determine whether an amount of a difference between the first temperature value TEMP1 and the second temperature value TEMP2 is less than a second predefined temperature threshold value TEMP_THR2. If this is the case, then a check is made in a step S20, corresponding to step S10 in FIG. 3, to determine whether the first torque value TQ1 is greater than the sum of the second torque value TQ2 and the predefined torque threshold value TQ_THR. If this condition is met, then a check is made in a step S21, corresponding to step S4 in FIG. 2, to determine whether the first temperature value TEMP1 is greater than the first predefined temperature threshold value TEMP_THR1.

If the condition in step S21 is met, then the error ERR is detected in a step S22, corresponding to step S5 in FIG. 2, and the program run is terminated in a step S23. The program run is also terminated in step S23 if the conditions in steps S19, S20 or S21 are not met.

Steps S17 to S22 can also be performed for each suitable operating state, e.g. for each idling operating state, during the operation of the internal combustion engine. Step S16 can be dispensed with if it is ensured that step S18 is performed during the second predefined time period, i.e. the internal combustion engine has already warmed up sufficiently, preferably to its operating temperature.

The second predefined temperature threshold value TEMP_THR2 is preferably specified such that the first torque value TQ1 and the second torque value TQ2 can be readily compared with each other. The second predefined temperature threshold value TEMP_THR2 amounts, for example, to approximately 5° C., but may also be specified as a different value. If, in step S20, the first torque value TQ1 is then greater than the sum of the second torque value TQ2 and the predefined torque threshold value TQ_THR, then there is a high probability that a cold start CS is present. If, in step S21, the first temperature value TEMP1 is greater than the first predefined temperature threshold value TEMP_THR1, then there is a high probability that the first temperature value TEMP1 is incorrect.

The second temperature value TEMP2 and/or the second torque value TQ2 can also be stored, preferably close in time to the terminating of the operation of the internal combustion engine, and read in during a subsequent next operation of the internal combustion engine. In this case a check can already be made after the recording of the first temperature value TEMP1 and the determining of the first torque value TQ1 with reference to the second temperature value TEMP2 and the second torque value TQ2 which were recorded or, as the case may be, determined during the preceding operation, to determine whether the cold start CS is present or whether the first temperature value TEMP1 is incorrect, even before the internal combustion engine has reached its normal operating temperature. In this case it should be taken into account if necessary that operating conditions of the internal combustion engine, e.g. the ambient temperature or the load, may have changed while the internal combustion engine was switched off.

The invention claimed is:

1. A method for checking temperature values of a temperature sensor of an internal combustion engine, comprising:
    recording a first temperature value a first predefined time period close in time to an operating state of the starting of the internal combustion engine;
    checking to determine whether a cold start of the internal combustion engine is present; and
    detecting an error in the first temperature value if the cold start is detected and the first temperature value is greater than a temperature threshold value,
    wherein a first torque value of the internal combustion engine is determined during the first predefined time period, a second torque value of the internal combustion engine is determined during at least one second predefined time period which lies after the first predefined time period in time, and the cold start of the internal combustion engine is detected if the first torque value is greater than the second torque value by a predefined amount or a predefined factor.

2. The method as claimed in claim 1, wherein the second predefined time period is close in time to a terminating of the operation of the internal combustion engine.

3. The method as claimed in claim 1, wherein the first torque value is averaged over a third predefined time period which is temporally within the first predefined time period, or the second torque value is averaged over a fourth predefined time period which is temporally within the second predefined time period.

4. The method as claimed in claim 1, wherein a second temperature value is recorded during the second predefined time period, and the cold start is detected only if the second temperature value is greater or less than the first temperature value by not more than a predefined amount or a predefined factor.

5. The method as claimed in claim 1, wherein the first predefined time period or a second predefined time period are in each case temporally within an idling state of operation of the internal combustion engine.

6. The method as claimed in claim 1, wherein the first torque value is averaged over a third predefined time period which is temporally within the first predefined time period, and the second torque value is averaged over a fourth predefined time period which is temporally within the second predefined time period.

7. The method as claimed in claim 1, wherein the first predefined time period and the second predefined time period are in each case temporally within an idling state of operation of the internal combustion engine.

8. A device for checking temperature values of a temperature sensor of an internal combustion engine, comprising:

an element of the device for recording a first temperature value during a first predefined time period close in time to an operating state of the starting of the internal combustion engine;

an element of the device for checking whether a cold start of the internal combustion engine is present; and an element of the device for detecting an error in the first temperature value if the cold start is detected and the first temperature value is greater than a temperature threshold value, wherein a first torque value of the internal combustion engine is determined during the first predefined time period, a second torque value of the internal combustion engine is determined during at least one second predefined time period which lies after the first predefined time period in time, and the cold start of the internal combustion engine is detected if the first torque value is greater than the second torque value by a predefined amount or a predefined factor.

* * * * *